(12) United States Patent
Kim et al.

(10) Patent No.: US 9,699,008 B2
(45) Date of Patent: Jul. 4, 2017

(54) METHOD AND APPARATUS FOR TRANSMITTING SIGNAL USING SLIDING-WINDOW SUPERPOSITION CODING IN WIRELESS NETWORK

(71) Applicant: Samsung Electronics Co., Ltd., Suwon-si, Gyeonggi-do (KR)

(72) Inventors: Kwangtaik Kim, Yongin-si (KR); Seokki Ahn, Suwon-si (KR); Young-Han Kim, La Jolla, CA (US); Hosung Park, Gwangju (KR); Lele Wang, San Diego, CA (US); Chiao-Yi Chen, La Jolla, CA (US); Jeongho Park, Seoul (KR)

(73) Assignees: Samsung Electronics Co., Ltd., Suwon-si (KR); The Regents of the University of California, Oakland, CA (US)

( * ) Notice: Subject to any disclaimer, the term of this patent is extended or adjusted under 35 U.S.C. 154(b) by 0 days.

(21) Appl. No.: 15/081,381

(22) Filed: Mar. 25, 2016

(65) Prior Publication Data

US 2016/0285656 A1    Sep. 29, 2016

(30) Foreign Application Priority Data

Mar. 27, 2015    (KR) .................. 10-2015-0043476

(51) Int. Cl.
*H04L 25/03*    (2006.01)
*H04L 25/06*    (2006.01)
*H04B 7/06*    (2006.01)

(52) U.S. Cl.
CPC ........ *H04L 25/03318* (2013.01); *H04L 25/06* (2013.01); *H04B 7/0626* (2013.01)

(58) Field of Classification Search
CPC .... H04B 7/0626; H04B 7/0652; H04B 7/066; H04L 25/0202; H04L 25/0222;
(Continued)

(56) References Cited

U.S. PATENT DOCUMENTS

| 2015/0078282 A1 | 3/2015 | Chae et al. |
| 2015/0263834 A1* | 9/2015 | Won ................ H04B 7/022 370/329 |

(Continued)

OTHER PUBLICATIONS

Wang et al.; Sliding-Window Superposition Coding for Interference Networks; 2014 IEEE International Symposium on Information Theory; Jul. 4, 2014; CA.

(Continued)

*Primary Examiner* — Young T Tse
(74) *Attorney, Agent, or Firm* — Jefferson IP Law, LLP

(57) ABSTRACT

The present disclosure relates to a pre-$5^{th}$-Generation (5G) or 5G communication system for supporting higher data rates beyond $4^{th}$-Generation (4G) communication system such as Long Term Evolution (LTE). A performance of the existing sliding-window superposition coding (SWSC) is degraded when a wireless channel state is changed due to a large scale fading and a small scale fading. In addition, the performance of the existing SWSC is degraded when channel state information at a receiver is different from that of the real channel. To resolve these problems, a transmitter applies an accurate data transmission rate suitable for a channel state. Therefore, a receiver applies an adaptive SWSC and to reduce a block error rate (BLER) and a hybrid automatic repeat request (HARQ) overhead of the receiver. In addition, to resolve wireless channel state change due to large and small scale fading, the transmitter may use the adaptive transmission method.

18 Claims, 24 Drawing Sheets

(58) Field of Classification Search
CPC ............. H04L 25/024; H04L 25/03178; H04L 25/03318; H04L 25/06; H04W 72/0426; H04W 88/08; H04W 88/085; H04W 92/08; H04W 92/10
USPC ....... 375/257–262, 265, 267, 324, 340, 341, 375/346, 348; 370/310, 328, 334, 339, 370/343, 345; 455/500, 503, 507, 517, 455/524, 526, 63.2
See application file for complete search history.

(56) References Cited

U.S. PATENT DOCUMENTS

2015/0327180 A1* 11/2015 Ryu ...................... H04W 52/18
                                                    370/329
2016/0037541 A1*  2/2016 Kim ................... H04W 72/085
                                                    370/329

OTHER PUBLICATIONS

Sharp; UCI Differentiation for Transmission on PUSCH with SU-MIMO; 3GPP TSG-RAN WG1#61bis; R1-103723; Jun. 28-Jul. 2, 2010; Dresden, Germany.

Vanka et al.; Superposition Coding Strategies; Design and Experimental Evaluation; IEEE Transactions on Wireless Communications; vol. 11, Issue: 7; May 23, 2012.

Park et al.; Interface management via sliding-window superposition coding; 2014 IEEE Globecom Workshops (GC Wkshps); Dec. 8-12, 2014; Austin, TX.

* cited by examiner

----- BACKHAUL LINK BETWEEN BS

METHOD AND APPARATUS FOR TRANSMITTING SIGNAL USING SLIDING-WINDOW SUPERPOSITION CODING IN WIRELESS NETWORK

CROSS-REFERENCE TO RELATED APPLICATION(S)

This application claims the benefit under 35 U.S.C. §119(a) of a Korean patent application filed on Mar. 27, 2015 in the Korean Intellectual Property Office and assigned Serial number 10-2015-0043476, the entire disclosure of which is hereby incorporated by reference.

TECHNICAL FIELD

The present disclosure relates to a method for communicating with users positioned in a cell edge where performance is degraded due to interference from an adjacent cell in a cellular communication environment. More particularly, the present disclosure relates to a method and an apparatus capable of applying a sliding-window superposition coding (SWSC) information theory scheme to a wireless cellular environment.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The sliding-window superposition coding (SWSC) is a coding method capable of reaching a theoretical critical value performance of a physical layer in an additive white Gaussian noise (AWGN) interference environment where a fading is not generated, and thus the SWSC has a high efficiency.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for transmitting or receiving a signal to or from users positioned in a cell edge.

In accordance with an aspect of the present disclosure, a method for receiving a signal by a user equipment (UE) using an SWSC in a wireless communication system is provided. The method includes transmitting channel state information from the UE to a base station (BS), receiving, from the BS, SWSC information of an SWSC method, wherein the SWSC information is determined based on the channel state information and resource allocation information of a neighbor BS received by the BS, receiving a signal to which the determined SWSC method is applied from the BS, and performing an adaptive decoding on an interference signal received simultaneously with the received signal based on the SWSC information.

In accordance with another aspect of the present disclosure, a method for transmitting a signal by a BS using an SWSC in a wireless communication system is provided. The method includes receiving channel state information by the BS from a UE, exchanging resource allocation information with a neighbor BS, determining an SWSC method to apply to a transmission signal based on the channel state information and the resource allocation information, transmitting SWSC information related to the determined SWSC method to the UE, and transmitting the transmission signal to which the determined SWSC method is applied.

In accordance with another aspect of the present disclosure, a UE for receiving a signal using an SWSC in a wireless communication system is provided. The UE includes a transceiver configured to transmit and receive a signal, and a controller configured to transmit channel state information to a BS, receive, from the BS, information of an SWSC method, wherein the SWSC method is determined based on the channel state information and resource allocation information of a neighbor BS received by the BS, receive a signal to which the determined SWSC method is applied from the BS, and perform an adaptive decoding on an interference signal received simultaneously with the received signal based on the SWSC information.

In accordance with another aspect of the present disclosure, a BS for transmitting a signal using an SWSC in a wireless communication system is provided. The BS includes a transceiver configured to transmit and receive a signal, and a controller configured to receive channel state information from a UE, exchange resource allocation information with a neighbor BS, determine an SWSC method applied to a transmission signal based on the channel state information and the resource allocation information, and transmit the transmission signal to which the determined SWSC method is applied.

According to a method for transmitting a signal by applying an SWSC in a wireless network of the present disclosure, consumed power can be reduced, frequency efficiency can be improved, and a block error rate (BLER) and a hybrid automatic repeat request (HARQ) overhead of a receiver can both be reduced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, in describing various embodiments of the present disclosure, a main substance of the present disclosure may be applied to even other communication systems that have a similar technical background with a little change in a range that is not largely out of the range of the present disclosure, and this may be possible by a determination of a person having a skilled technical knowledge in a technical field of the present disclosure.

The advantages and features of the present disclosure will be apparent by making reference to various embodiments as described below in detail in conjunction with the accompanying drawings. However, the present disclosure is not limited to the various embodiments set forth below, but may be implemented in various different forms.

Figure 1:
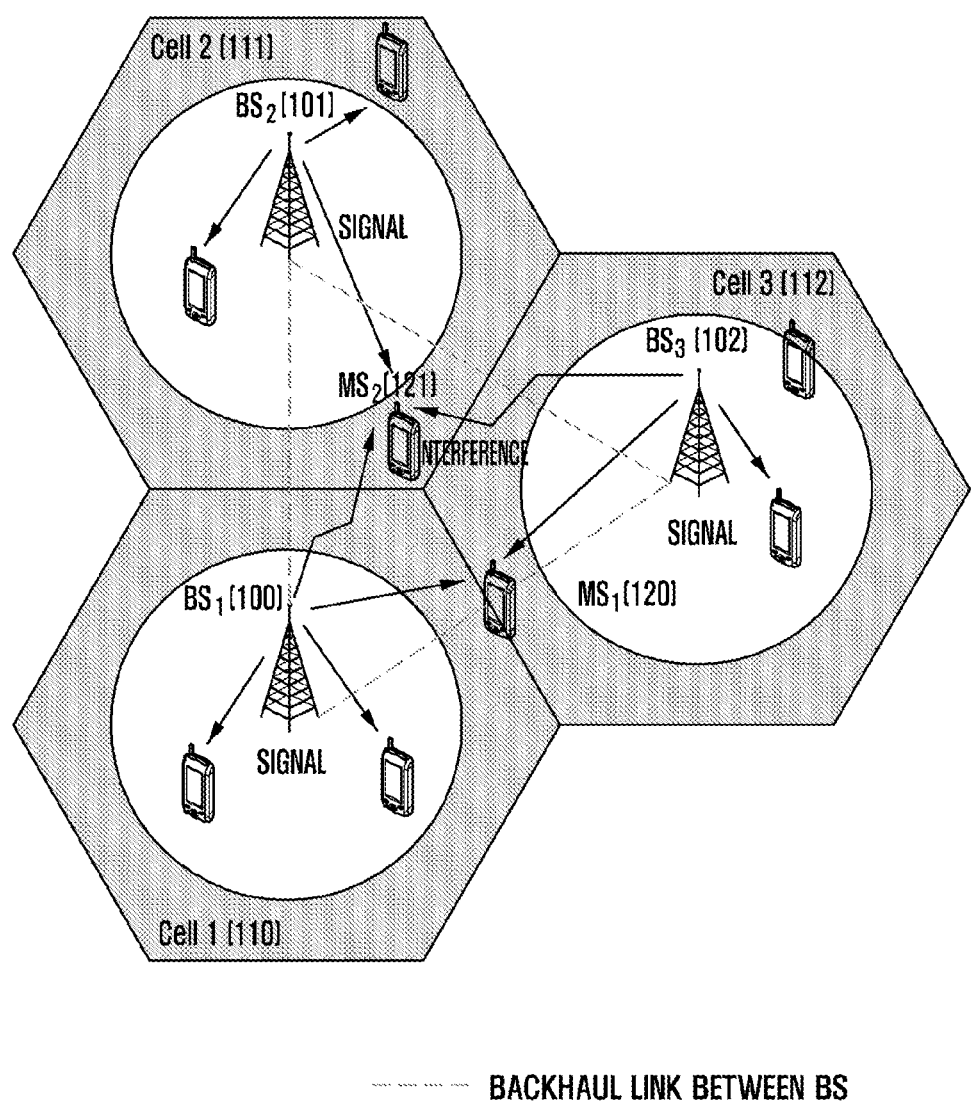
FIG. 1 is a view illustrating an interference environment to which a sliding-window superposition coding (SWSC) may be applied according to the related art.

FIG. 1 is a view illustrating an interference environment to which an SWSC may be applied according to the related art.

Referring to FIG. 1, a first base station (BS), $BS_1$ 100, is located in a cell 1 110, a $BS_2$ 101 is located in a cell 2 111, and a $BS_3$ 102 is located in a cell 3 112. A first mobile station (MS, hereinafter, may be referred to as MS, terminal, user equipment (UE), or the like), $MS_1$ 120, receives a signal transmitted from the $BS_1$ and $BS_3$, and a $MS_2$ 121 receives a signal transmitted from the $BS_2$. At this time, the $MS_1$ receives the signals transmitted from the $BS_1$ and the $BS_3$, and this acts as an interference to $MS_2$.

An SWSC method which may be applied to such a situation is described based on Table 1.

TABLE 1

| Block | 1 | 2 | 3 | ... | b-1 | b |
|---|---|---|---|---|---|---|
| U | 1 | $m_{11}$ | $m_{12}$ | ... | ... | $m_{1,b-1}$ |
| V | $m_{12}$ | $m_{12}$ | | ... | $m_{1,b-1}$ | 1 |
| $X_1 = f(U, V)$ | | | ... | | | |
| $X_2$ | $m_{21}$ | $m_{22}$ | ... | ... | $m_{2,b-1}$ | $m_{2b}$ |
| $Y_1$ | ⌀ | $\hat{m}_{11}$ | $\hat{m}_{12}$ | ... | ... | $\hat{m}_{1,b-1}$ |
| | $\hat{m}_{21}$ | $\hat{m}_{22}$ | ... | ... | $\hat{m}_{2,b-1}$ | $\hat{m}_{2b}$ |
| $Y_2$ | ⌀ | $\hat{m}_{11}$ | $\hat{m}_{12}$ | ... | ... | $\hat{m}_{1,b-1}$ |
| | ⌀ | $\hat{m}_{21}$ | $\hat{m}_{22}$ | ... | ... | $\hat{m}_{2,b-1}, \hat{m}_{2b}$ |

A transmitter 1 transmits a codeword $X_1$ to a receiver 1, and a transmitter 2 transmits a codeword $X_2$ to a receiver 2. At this time, the transmitter may be the BS, and the receiver may be the MS. The transmitter transmits one message through a plurality of blocks, and, to transmit the message through the plurality of blocks, the transmitter forms a codeword by superposing a plurality of layers. Specifically, the transmitter 1 performs a superposition coding on U codeword and V codeword to the $X_1$ codeword, and the transmitter 2 transmits the codeword $X_2$ in a point-to-point method, which is the existing method. At this time, the U codeword and the V codeword may be one layer. Blocks 1 to b form one subframe.

The transmitter 1 codes a message 1, which is known by both the transmitter and the receiver, to a codeword U(1) in a block 1, which is a first block, and codes the $m_{11}$ message, which is to be transmitted to the receiver to codeword V(1). Next, the transmitter 1 performs a superposition coding on codewords U(1) and V(1) to form codeword X1(1), and transmits the codeword $X_1(1)$ to the receiver 1. In a block 2 which is a second block, the transmitter 1 codes the $m_{11}$ message to a codeword U(2), and codes the $m_{12}$ message to codeword V(2). Next, the transmitter 1 performs a superposition coding on codewords U(2) and V(2) to form codeword $X_1(2)$, and transmits the codeword $X_1(2)$ to the receiver 1. In the same manner, the transmitter 1 transmits a codeword generated up to block b−1 to the receiver 1. In block b, which is the last block, the transmitter 1 codes the $m_{1,b-1}$ message to codeword U(b), and codes the message 1, which is known by both of the transmitter and the receiver, to a codeword V(b). Next, the transmitter 1 performs a superposition coding on codewords U(b) and V(b) to form codeword $X_1(b)$, and transmits the codeword $X_1(b)$ to the receiver 1.

The transmitter 2 codes the $m_{21}$ message to codeword $X_2(1)$ and transmits the codeword $X_2(1)$ to a receiver 2 in the block 1. In addition, the transmitter 2 codes the $m_{22}$ message to codeword $X_2(2)$ and transmits the codeword $X_2(2)$ to the receiver 2 in the block 2. In the same manner, the transmitter 2 transmits a codeword generated in up to the block b to the transmitter 2.

Since the transmitter transmits the same message through two blocks, the receiver performs a decoding by using a superposed received signal, which was transmitted through the two blocks. The signal transmitted from the transmitter 1 passes through a required channel from the transmitter 1 to the receiver 1, and the signal transmitted from the transmitter 2 passes through an interference channel from the transmitter 2 to the receiver 1. Therefore, a superposed signal is generated and a received signal $Y_1$, which is generated by adding the superposed signal and noise, is received by the receiver 1. The signal transmitted from the transmitter 2 passes through a required channel from the transmitter 2 to the receiver 2, and the signal transmitted from the transmitter 1 passes through an interference channel from the transmitter 1 to the receiver 2. Therefore, the superposed signal is generated and a received signal $Y_2$, which is generated by adding the superposed signal and noise, is received by the receiver 2. The receiver 1 cancels codeword U(1), regards codeword V(1) as noise, and decodes codeword $X_2(1)$, which is an interference signal to the receiver 1, using the message 1, which is known based on received signals $Y_1(1)$ and $Y_1(2)$. Next, the receiver 1 cancels codeword U(1) using the message 1, cancels codeword $X_2(1)$, which is decoded in the previous step, regards codewords V(2) and $X_2(2)$ as noise, decodes any codewords required [V(1) U(2)], and recovers the message $m_{11}$. When a superposed received signal $Y_1(3)$ is received in a block 3, U(2), that is $m_{11}$, is regarded as a known message, and thus the same operation is repeated. When the received signal $Y_1(b)$ superposed in the last block b is received by the receiver, the same operation is repeated, but since codeword V(b) is a known message, this information may be cancelled.

The receiver 2 also repeats an operation similar to that of the receiver 1. The receiver 2 cancels codeword U(1), regards codewords $X_2(1)$, V(2) and $X_2(2)$ as noise and decodes codewords [V(1) U(2)], which is an interference signal to the receiver 1, using the message 1 known based on received signals $Y_2(1)$ and $Y_2(2)$ to recover the message $m_{21}$. Next, the receiver 2 cancels codeword U(1) using the message 1, cancels codeword V(1) which is decoded in previous step, recodes codeword $X_2(1)$, and recovers the message $m_{21}$. In the same manner as the receiver 1, the receiver 2 repeats the same operation, and performs a decoding by using a cancellation of V(b) including a known message in the last block b.

The SWSC is a coding method capable of reaching a theoretical critical value performance of a physical layer in an additive white Gaussian noise (AWGN) interference environment where a fading is not generated, and thus the SWSC has a high efficiency.

However, performance of the existing sliding-window superposition coding (SWSC) is degraded when a wireless channel state is changed because of a large scale fading and a small scale fading. In addition, performance of the existing SWSC is degraded when channel state information at the receiver is different from that of the real channel.

Figure 2:
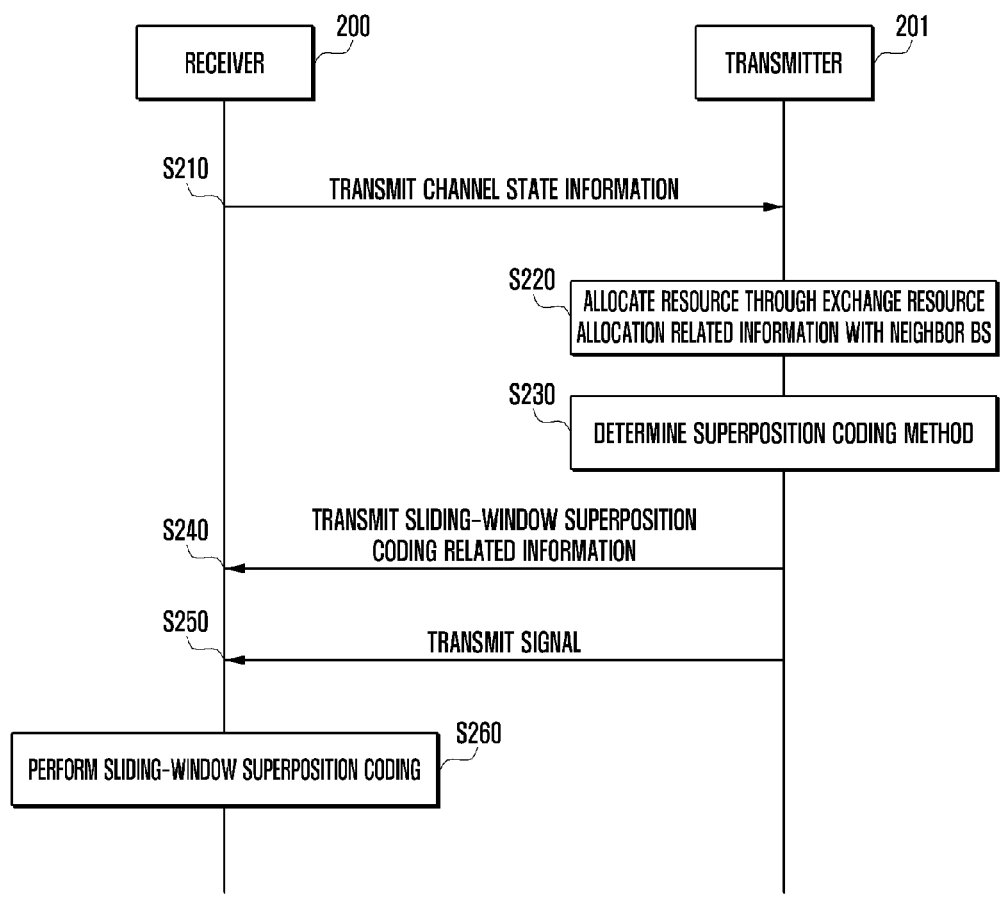
FIG. 2 is a flow diagram of a method for performing an adaptive SWSC by a receiver according to an embodiment of the present disclosure.

FIG. 2 is a flow diagram of a method for performing an adaptive sliding-window superposition coding (SWSC) by a receiver according to an embodiment of the present disclosure.

The SWSC is a method in which a transmitter applies an accurate data transmission rate (i.e., a data transfer rate, a transmission amount, etc.) suitable for a channel state, and although the transmitter cannot transmit data, a receiver adaptively uses the SWSC to reduce a block error rate (BLER) and a hybrid automatic repeat request (HARQ) overhead of the receiver.

Referring to FIG. 2, the receiver 200 (e.g., a user equipment (UE)) transmits channel state information to the transmitter (e.g., a network (N/W), a base station (BS), etc.) at operation S210. The transmitter exchanges information related to a resource allocation with a neighbor BS to adjust a resource allocation at operation S220. The information related to the resource allocation may include at least one of information for synchronizing between the transmitters, information related to transmission rates and a coding method of signals of each transmitter (e.g., a transmission rate pair, hereinafter, the transmission rate pair may be replaced with a transmission amount pair, data coding method and a modulation method used by a neighbor transmitter), which are received by the receiver, and information related to a configuration of a block transmitted by an SWSC method (e.g., the number of blocks, resource allocation of the block, and the like). The transmitter determines a method of a superposition coding based on the channel state and the information related to the resource allocation at operation S230. The transmitter transmits the SWSC related information (specifically, a superposition method, a modulation method, a code rate and the like) including information on the determined coding method and the like to the receiver at operation S240. The transmitter transmits a signal to which the determined SWSC method is applied at operation S250. The receiver simultaneously receives the signal and an interference signal and performs an adaptive SWSC at operation S260.

The adaptive SWSC adaptively changes a decoding sequence of a codeword received by the receiver based on a channel situation such as a signal to interference ratio (SIR) and the like. The adaptive SWSC is selectively operated among three following decoding sequences.

Figure 3A:
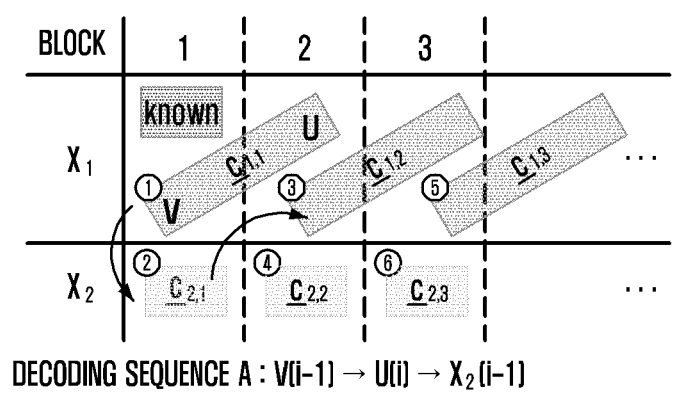
FIGS. 3A to 3C illustrate a decoding sequence applied to an adaptive SWSC according to various embodiments of the present disclosure.
Figure 3B:
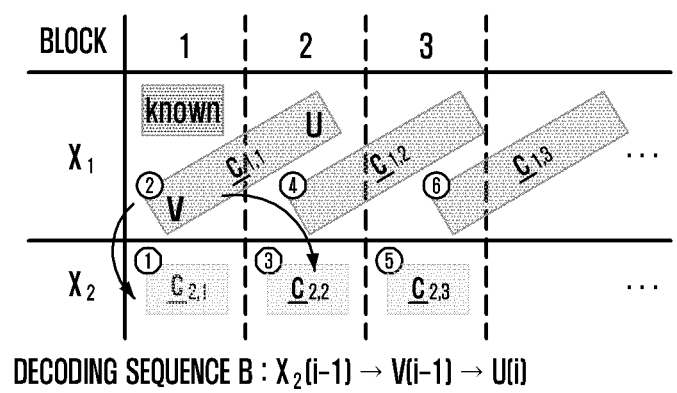
Figure 3C:
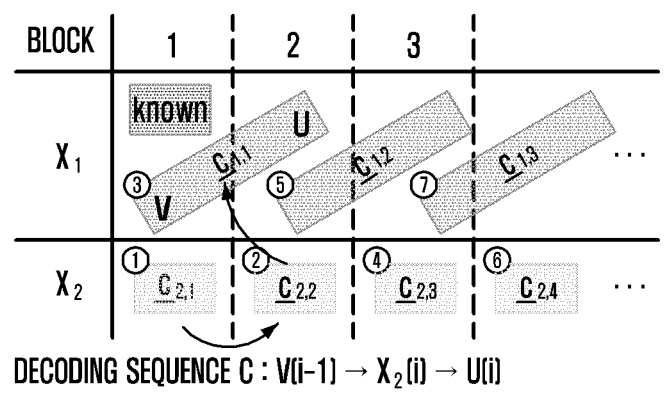

FIGS. 3A to 3C illustrate a decoding sequence which may be applied to an adaptive SWSC according to various embodiments of the present disclosure.

Referring to FIGS. 3A to 3C, the decoding sequence may be applied to a receiver 1 and a receiver 2.

Referring to FIG. 3A, decoding sequence A is illustrated. In decoding sequence A, the receiver decodes V(i−1), decodes U(i), and decodes X2(i−1). This method is treated as an interference as noise (IAN) method to the receiver 1, and is operated as a successive cancellation decoding (SCD) method to the receiver 2. IAN is a decoding method for handing an interference equally to noise and SCD is a decoding method for successively cancelling an interference. Referring to FIG. 3B, decoding sequence B is illustrated. In decoding sequence B, the receiver decodes X2(i−1), decodes V(i−1), and decodes U(i). Referring to FIG. 3C, a decoding sequence C is illustrated. The receiver decodes V(i−1), decodes X2(i), and decodes U(i). Decoding sequence C is operated as an IAN method to the receiver 2, and is operated as an SCD method to the receiver 1.

Figure 4A:
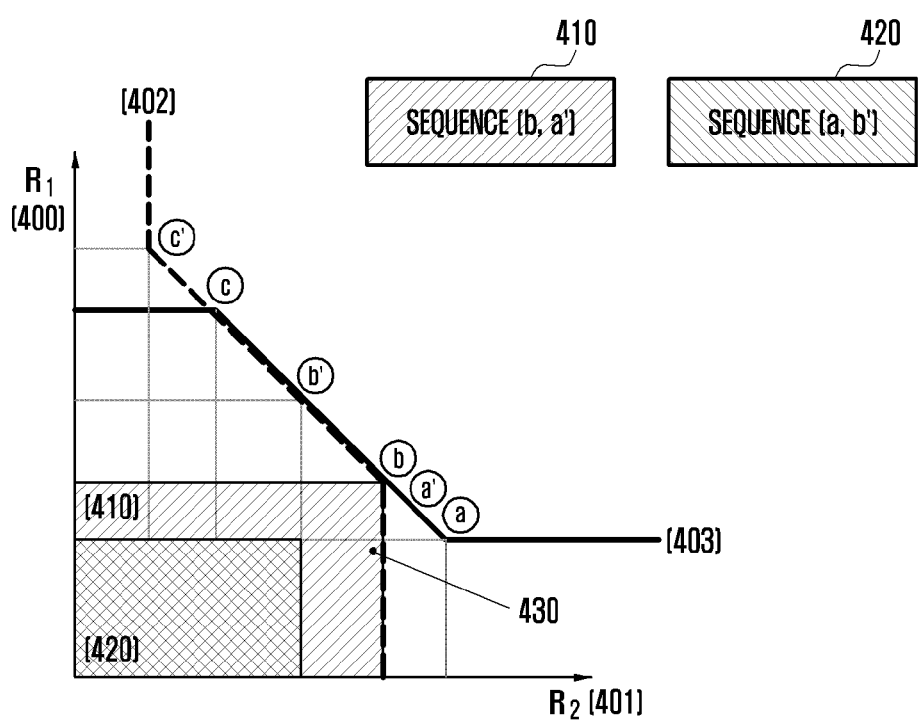
FIGS. 4A and 4B are graphs illustrating an effect of an adaptive SWSC according to various embodiments of the present disclosure.
Figure 4B:
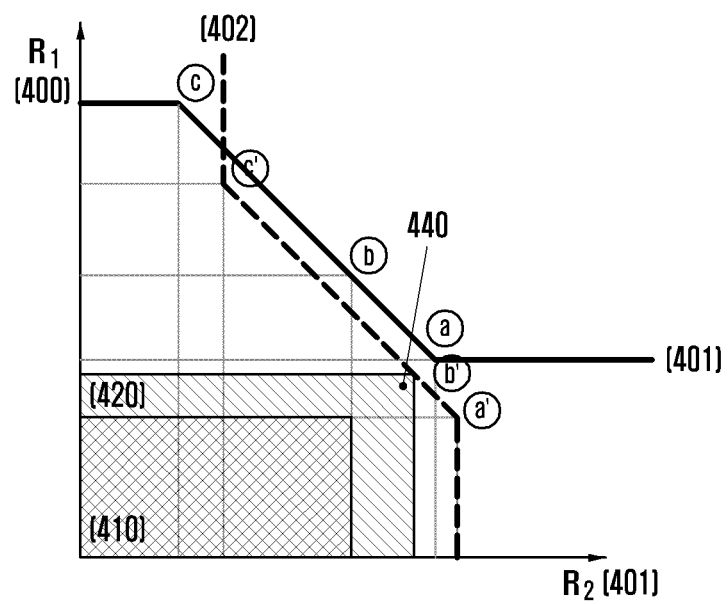

FIGS. 4A and 4B are graphs illustrating an effect of an adaptive SWSC according to various embodiments of the present disclosure.

Referring to FIGS. 4A and 4B, according to an application of different decoding sequences, a possibility of a reception of data is different when the transmitter 1 and the transmitter 2 transmit data in a specific rate pair. In FIGS. 4A and 4B, axis R1 400 is a transmission rate transmitted by the transmitter 1, axis R2 401 is a transmission rate transmitted by the transmitter 2, and a reference numeral 402 is an amount of data which may be received by the receiver 2 for data transmitted from the transmitter 1 and the transmitter 2. A reference numeral 403 is a data amount which may be received by the receiver 1 for the data transmitted from the transmitter 1 and the transmitter 2. The reference characters a, b and c are achievable rate regions (which may be referred to as achievable transmission amount regions) where a decoding is possible when the receiver 1 applies each of decoding sequences a, b and c and there is a transmission rate pair. Reference characters a', b' and c' are achievable rate regions when the receiver 2 applies each of decoding sequences a, b and c. A reference numeral 410 illustrates a commonly achievable rate region (i.e., a superposed region of b and a') when the receiver 1 and the receiver 2 apply the decoding sequences b and a, respectively. A reference numeral 420 illustrates a commonly achievable rate region (i.e., a superposed region of a and n') when the receiver 1 and the receiver 2 apply the decoding sequences a and b, respectively.

Referring to FIG. 4A, when the transmission rate pair of the transmitter 1 and the transmitter 2 is the same as the reference numeral 430, the reference numeral 430 is included in the region 410 but is not included in the region 420. Therefore, in this case, in decoding by the receiver 1 and the receiver 2, decoding sequence b is an optimal sequence to the receiver 1 and decoding sequence a is an optimal sequence to the receiver 2.

Referring to FIG. 4B, when the transmission rate pair of the transmitter 1 and the transmitter 2 is the same as the reference numeral 440, the reference numeral 440 is included in the region 420. Therefore, in this case, in decoding by the receiver 1 and the receiver 2, decoding sequence a is an optimal sequence for the receiver 1 and decoding sequence b is an optimal sequence for the receiver 2.

As described above, when decoding sequences of each receiver are changed to the SIR, an optimal decoding result according to the transmission rate of data transmitted from each transmitter may be obtained.

At this time, the receiver may simultaneously receive the signal and the interference signal and may perform one among the three operations, which are described below, after measuring a signal to noise ratio (SNR) and an interference to noise ratio (INR) through a channel estimation. Alternatively, the receiver may select at least two among the three operations to perform a combination thereof.

First, the receiver may calculate an achievable rate region thereof using an equation to determine the best decoding direction. The receiver may calculate the achievable rate region based on the channel estimation value (i.e., SNR and INR) and SWSC related information to determine a decoding sequence which is the most suitable for a transmission rate pair. Second, the receiver may search a table for a decoding direction based on the channel estimation value and the SWSC related information to determine a decoding sequence which is the most suitable for the transmission rate pair. Third, the receiver may perform a decoding by applying all decoding sequences in a specific range based on the channel estimation value and the SWSC related information, and then may compare a result of the performance to determine the decoding sequence which is the most suitable for the transmission rate pair.

As another example of the performance of the SWSC, a soft information decoding method may be applied. In the soft information decoding method, the receiver performs a soft decision rather than a hard decision on a decoding result of each codeword among SWSCs, stores soft information, and utilizes the soft information as priori information when a log likelihood ratio is calculated.

Figure 5A:
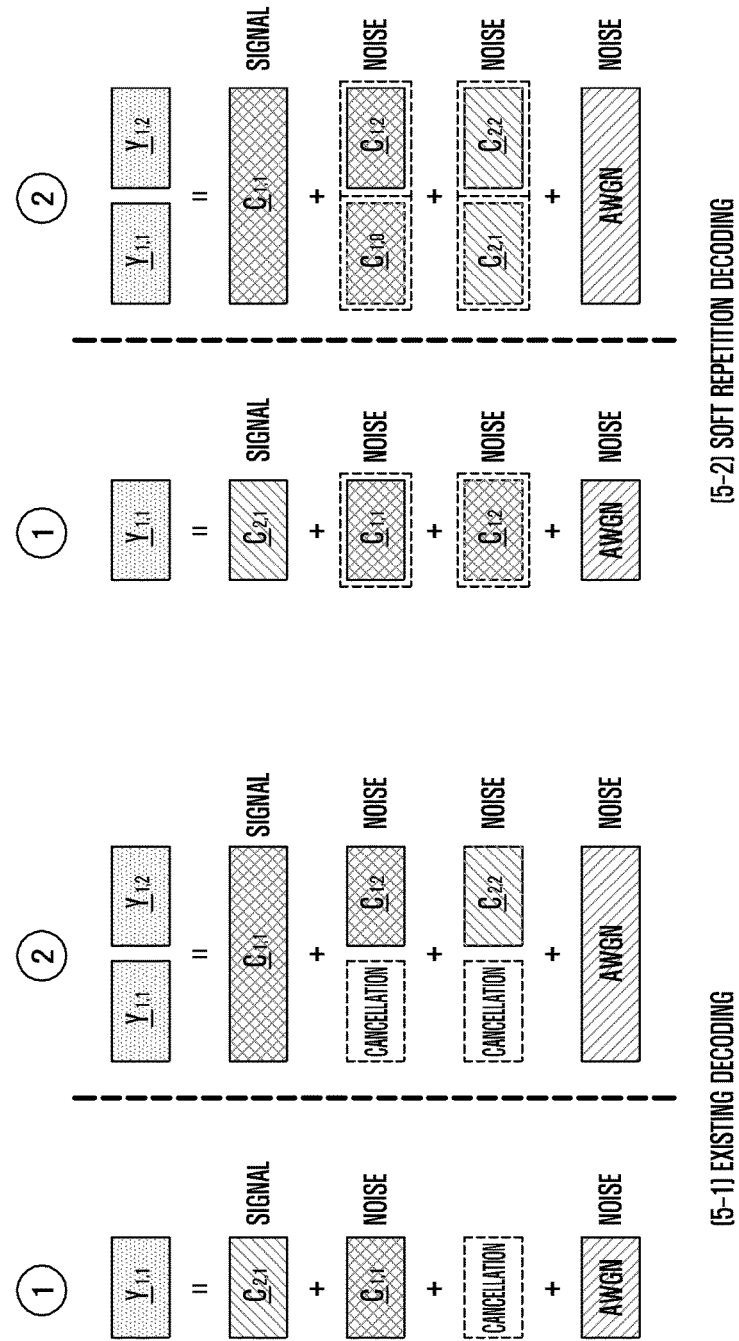
FIG. 5A illustrates soft repetition decoding according to an embodiment of the present disclosure.

FIG. 5A illustrates soft repetition decoding according to various embodiments of the present disclosure.

Referring to FIG. 5A, in an existing decoding method 5-1, when a required codeword C(2,1) is decoded or a codeword C(1,1) is decoded, the decoding is performed by cancelling another codeword received together or treating another codeword as noise. However, according to a soft repetition decoding method 5-2, since a decoding result of another code word (e.g., C(1, 2) in the case 1, C(1,0) and C(1,2) in the case 2) which is canceled in the existing decoding method is stored as soft information, the receiver may obtain more accurate decoding results by utilizing the soft information.

Figure 5B:
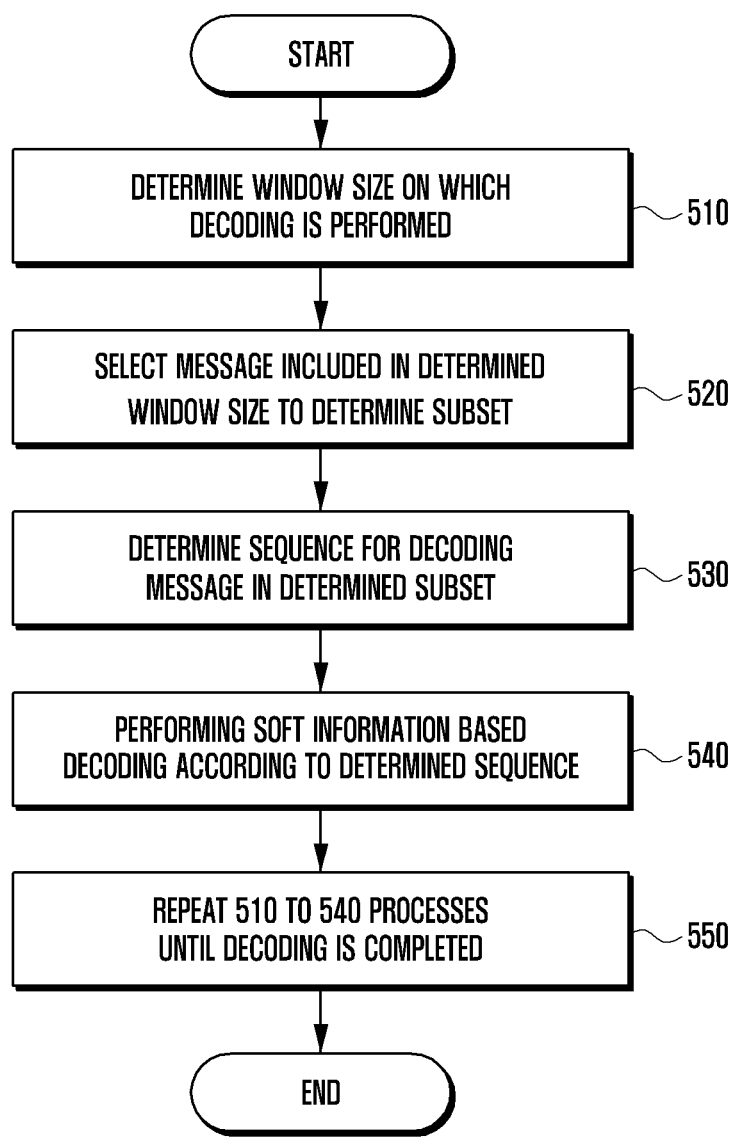
FIG. 5B is a flowchart of soft repetition decoding based on SWSC using soft information according to an embodiment of the present disclosure.

FIG. 5B is a flowchart of soft repetition decoding based on an SWSC using soft information according to an embodiment of the present disclosure.

Referring to FIG. 5B, the receiver determines the window size on which a decoding is performed according to a characteristic of a sliding-window decoding at operation 510, randomly selects some of a plurality of messages in the determined window size to determine one subset at operation 520, determines a sequence for decoding the selected message in the determined subset at operation 530 (at this time, a repetition process may be included), and performs a soft information based (repetition) decoding which recovers each message according to the determined sequence at operation 540. The receiver performs a sliding-shift on the window according to the size determined by repeating operations 510 to 540 until the decoding is completed at operation 550.

In such a sequence, a method for performing the soft repetition decoding may variously exist. First, the receiver may sequentially decode the codeword included in from block 1 to block b in a subframe while repeating a decoding in a block. Second, after decoding from the block 1 to the block b in the subframe unit, the receiver may return to the first to decode from the block 1 to the block b. Third, after decoding from the block 1 to the block b in the subframe unit, the receiver may decode from the block b to the block 1 in an opposite direction. Fourth, there is a hybrid soft/hard decision method in which a hard decision is performed on a codeword in the middle of the decoding to prevent an error propagation and then a result of the hard decision is transmitted to the next block.

At this time, the receiver may use a proper decoding sequence among three types of decoding sequences in the case of the soft repetition decoding. When the receiver repeats the decoding, the receiver may perform the decoding in the same decoding sequence or may perform the decoding in different decoding sequences. As an example, when the soft repetition decoding is scheduled in the second method, when the receiver performs the decoding from the block 1 to the block b, the receiver may use the decoding sequence a, and when the receiver performs the decoding from the block 1 to the block b again, the receiver may use the decoding sequence a or decoding sequence b.

Figure 6A:
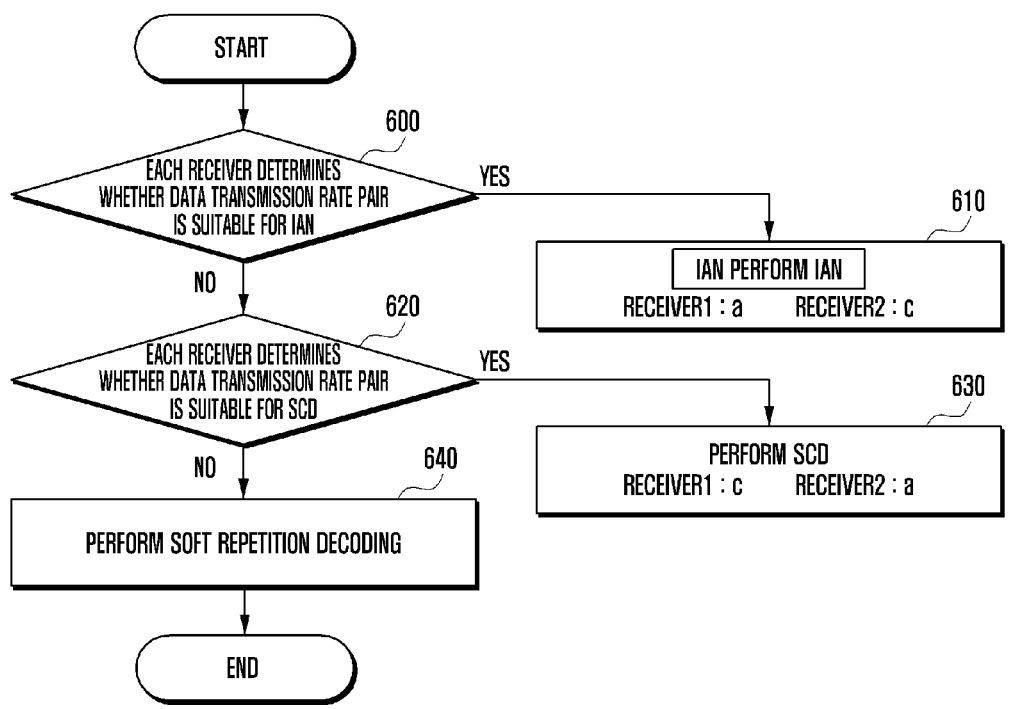
FIG. 6A is a flowchart of an adaptive SWSC method using a soft repetition decoding according to an embodiment of the present disclosure.

FIG. 6A is a flowchart of an adaptive SWSC method using a soft repetition decoding according to an embodiment of the present disclosure.

Referring to FIG. 6A, the receiver 1 and the receiver 2 determine whether transmission rates of data transmitted from each of the transmitter 1 and the transmitter 2 are suitable for an IAN method at operation 600. As a result of the determination, when the transmission rates are suitable for the IAN method, the receiver 1 uses a decoding sequence a, and the receiver 2 uses a decoding sequence c at operation 610. When the transmission rates are not suitable for the IAN method, the receiver 1 and the receiver 2 determine whether transmission rates of data transmitted from each of the transmitter 1 and the transmitter 2 are suitable for an SCD method at operation 620. When the transmission rates are suitable for the SCD method, the receiver 1 uses a decoding sequence c, and the receiver 2 uses a decoding sequence a at operation 630. When the transmission rates are not suitable for the SCD method, the receiver performs the soft repetition decoding at operation 640.

Figure 6B:
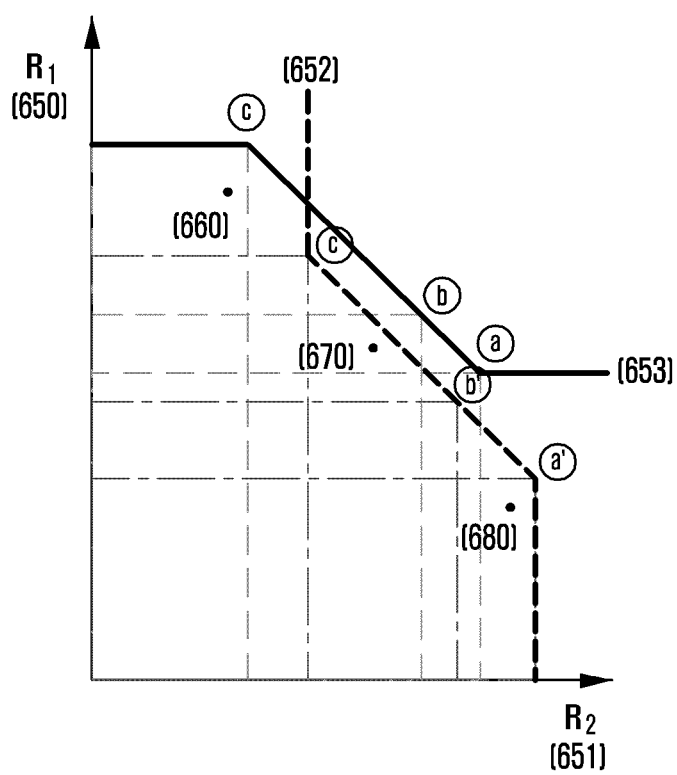
FIG. 6B is a graph illustrating a data transmission rate pair of an adaptive SWSC method using a soft repetition decoding according to an embodiment of the present disclosure.

FIG. 6B is a graph illustrating a data transmission rate pair of an adaptive SWSC method using a soft repetition decoding according to an embodiment of the present disclosure.

Referring to FIG. 6B, an axis R1 650 represents a transmission rate transmitted by the transmitter 1, an axis R2 651 represents a transmission rate transmitted by the transmitter 2, and reference numeral 652 represents an amount of data which may be received by the receiver 2 for data transmitted from the transmitter 2. The reference numerals a, b and c are achievable rate regions when the receiver 1 uses decoding sequences a, b and c. The reference numerals a', b' and c' are achievable rate regions when the receiver 2 uses decoding sequences a, b and c.

At this time, when the transmission rate pair of the transmitter 1 and the transmitter 2 correspond to reference numeral 660, the reference numeral 660 is included in a region where the reference numeral c and the reference numeral c' are superposed. Therefore, in this case, decoding sequence c is an optimal sequence to the receiver 1 and decoding sequence c is an optimal sequence to the receiver 2. In addition, when the transmission rate pair of the transmitter 1 and the transmitter 2 corresponds to reference numeral 680, the reference numeral 680 is included in a region where the reference numeral a and the reference numeral a' are superposed. Therefore, in this case, decoding sequence a is an optimal sequence to the receiver 1 and decoding sequence a' is an optimal sequence to the receiver 2.

When the transmission rate pair of the transmitter 1 and the transmitter 2 correspond to reference numeral 670 (i.e., in a case of a sum rate section where is not a region favorable for the IAN or SCD), the receiver may perform the soft repetition decoding.

Figure 7A:
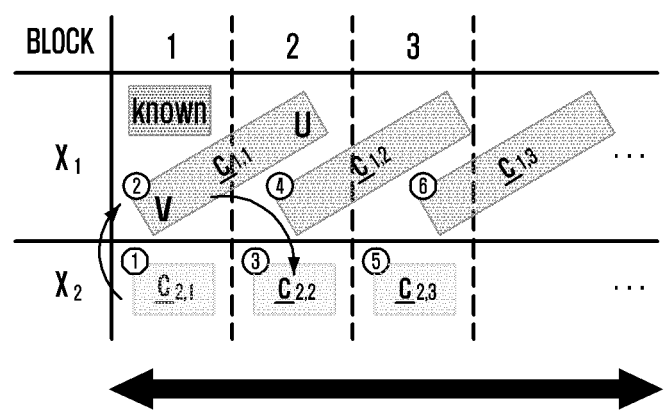
FIGS. 7A to 7C illustrate performing a soft repetition decoding by a receiver according to various embodiments of the present disclosure.
Figure 7B:
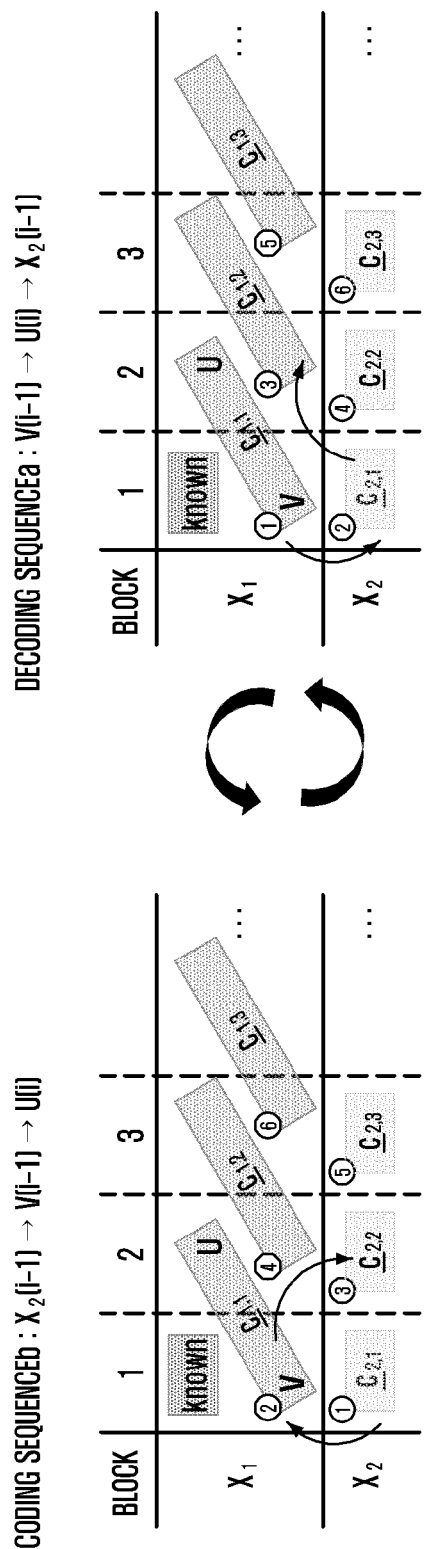
Figure 7C:
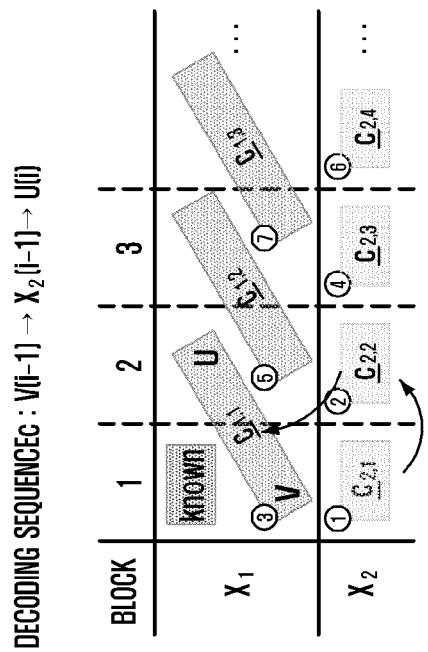
Figure 7C:
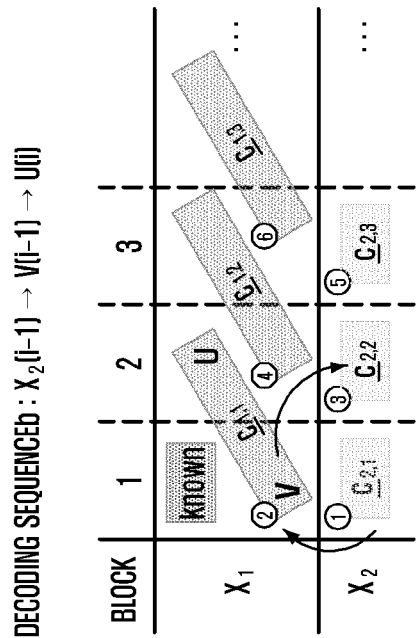

FIGS. 7A to 7C illustrate performing a soft repetition decoding by a receiver according to various embodiments of the present disclosure.

Referring to FIG. 7A, the receiver may perform the soft repetition decoding while repeating the decoding from the block 1 to the block b or from the block b to the block 1 by using the decoding sequence b in the subframe unit. Referring to FIG. 7B, the receiver may perform the soft repetition decoding by alternately using the decoding sequence b and the decoding sequence a in a block or subframe unit. Specifically, when the receiver receives the block 1, the receiver may perform the decoding in the decoding sequence a after performing the decoding in the decoding sequence b, and then decodes the next block. Further, the receiver may decode from the block 1 to the block b in the decoding sequence b, and then may decode from the block 1 to the block b again (or oppositely) in the decoding sequence a. Referring to FIG. 7C, the receiver may perform the soft repetition decoding by alternately using the decoding sequence b and the decoding sequence c in a block or subframe unit. Specifically, when the receiver receives the block 1, the receiver may perform the decoding in the decoding sequence c after performing the decoding in the decoding sequence b, and then decode the next block. Further, the receiver may decode from the block 1 to the block b in the decoding sequence b, and then may decode from the block 1 to the block b again (or oppositely) in the decoding sequence c.

As another example of the SWSC, to improve performance of the existing SWSC when a wireless channel state is changed due to a large scale fading and a small scale fading, the transmitter may use an adaptive transmission method. The adaptive transmission performs an optimal superposition coding which supports a quality of service (QoS) by utilizing channel state information at the transmitter (CSIT). The adaptive transmission method may select the number of layers, a structure of the layer in the case of the superposition, and a bit mapping which is a combination method in the layer, and may differently apply a power ratio α between each layer.

Figure 8:
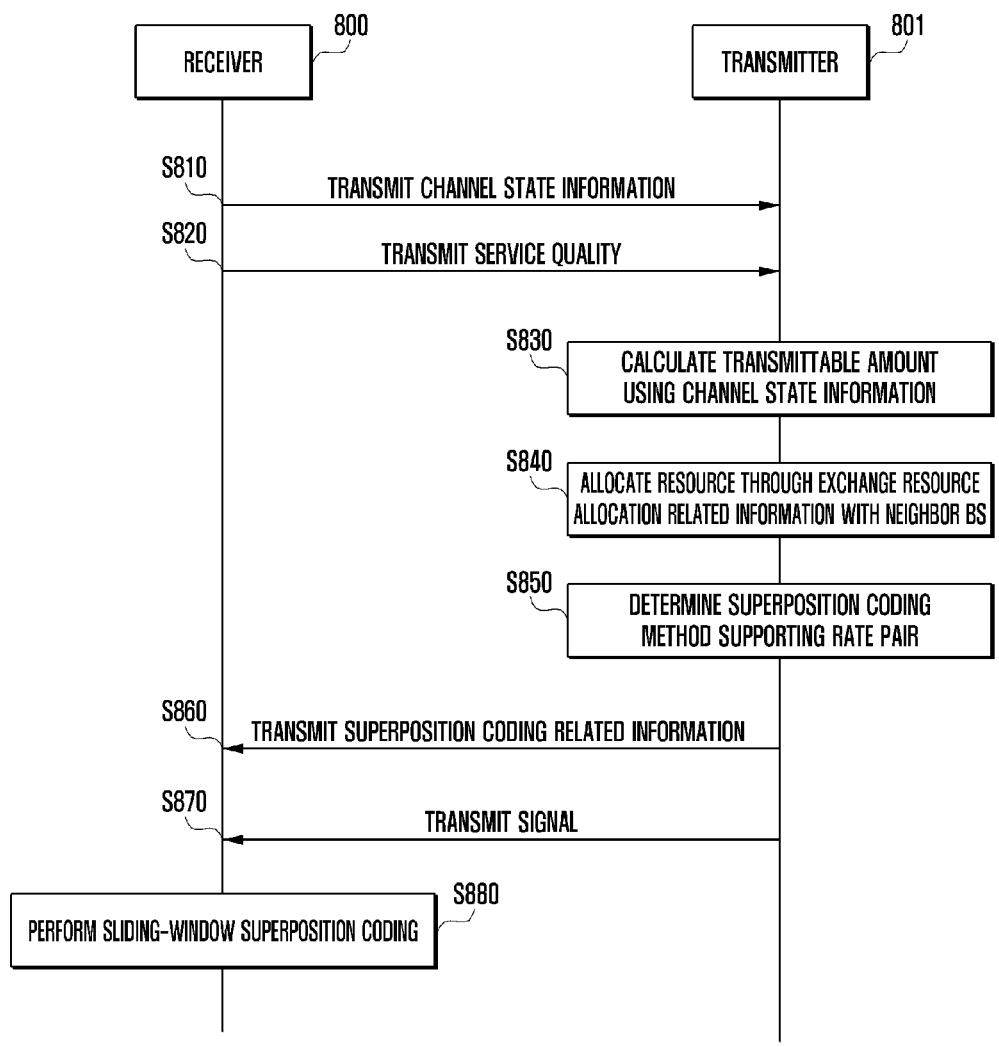
FIG. 8 is a flow diagram for applying an adaptive transmission to a transmitter according to an embodiment of the present disclosure.

FIG. 8 is a flow diagram for applying an adaptive transmission to a transmitter according to an embodiment of the present disclosure.

Referring to FIG. 8, the receiver (which may be a UE) 800 periodically or aperiodically transmits channel state information to a transmitter (which may be an N/W or a BS) 801 at operation S810. In addition, the receiver 800 reports a service quality determined as a requirement in an application hierarchy to the transmitter 801 at operation S820. Generally, the channel state information is reported more frequently than the service quality. The transmitter 801 calculates an achievable rate region using the received channel state information at operation S830. In addition, the transmitter 801 exchanges resource allocation related information with a neighbor transmitter to adjust a resource allocation at operation S840. The transmitter 801 determines a transmission rate pair based on the achievable rate region, the resource allocation related information and the service quality, and then determines a suitable superposition coding method which supports the determined rate pair at operation S850. The transmitter 801 may determine the power ratio between each layer in the case of the superposition, the numbers of the layers, the structure of the layer, and the bit mapping. Alternatively, some of these may be fixed, and others may be determined.

The transmitter 801 transmits the determined superposition coding related information to the receiver 800 at operation S860. Next, the transmitter 801 transmits the signal to the receiver 800 at operation S870. The receiver 800 performs the SWSC based on the superposition coding related information transmitted from the transmitter 801 at operation S880.

Figure 9A:
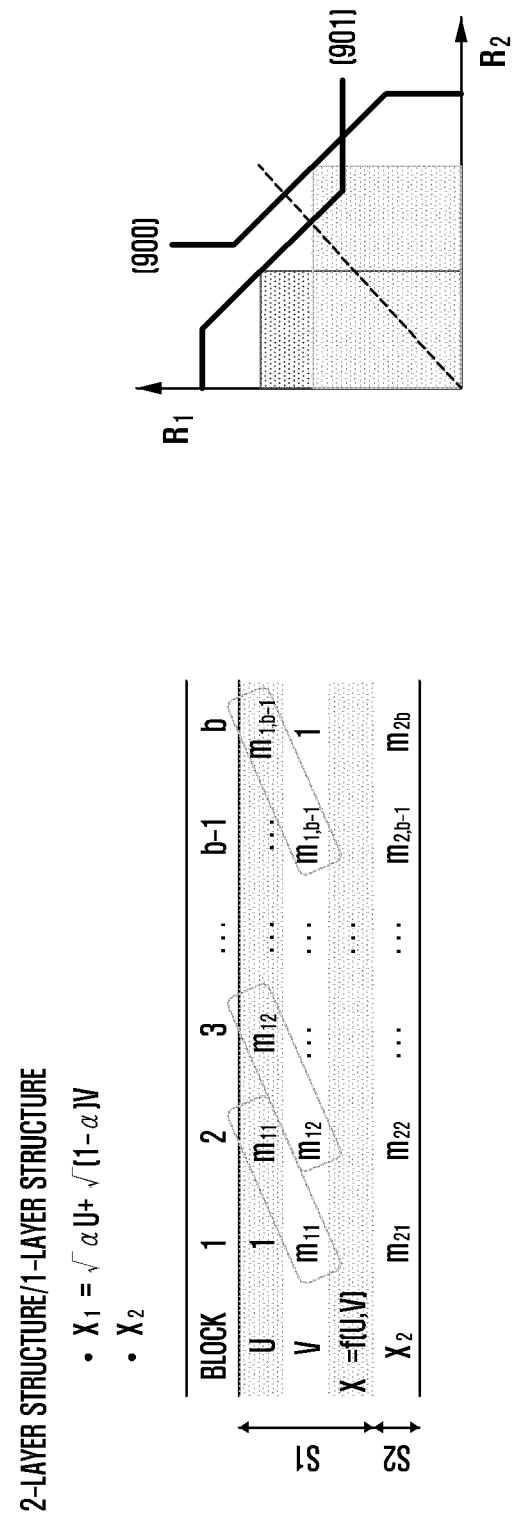
FIGS. 9A and 9B illustrate a case in which a structure of a layer is different in a case of a superposition during an adaptive transmission according to various embodiments of the present disclosure.
Figure 9B:
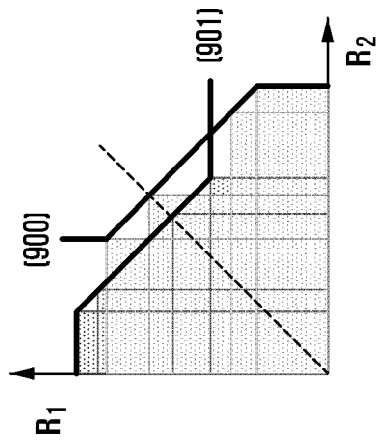

FIGS. 9A and 9B illustrate a case in which a structure of a layer is different in a case of a superposition during an adaptive transmission according to various embodiments of the present disclosure.

Referring to FIGS. 9A and 9B, FIG. 9A illustrates a case in which only the transmitter 1 uses the superposition coding, and FIG. 9B illustrates a case in which both of the transmitter 1 and the transmitter 2 use the superposition coding. At this time, although an amount 900 of data which may be received by the receiver 2 for the data transmitted from the transmitter 1 and the transmitter 2 is the same as an amount 901 of data which may be received by the receiver 1 for the data transmitted from the transmitter 1 and the transmitter 2, when two transmitters use the superposition coding, a more varied range of achievable rate regions are generated compared to when one transmitter uses the superposition coding. Therefore, when both of the transmitters use the superposition coding, and when the various channel states and transmission rate pair, the SWSC may be effectively performed.

In addition, the transmitter may use various bit mapping methods.

Figure 10:
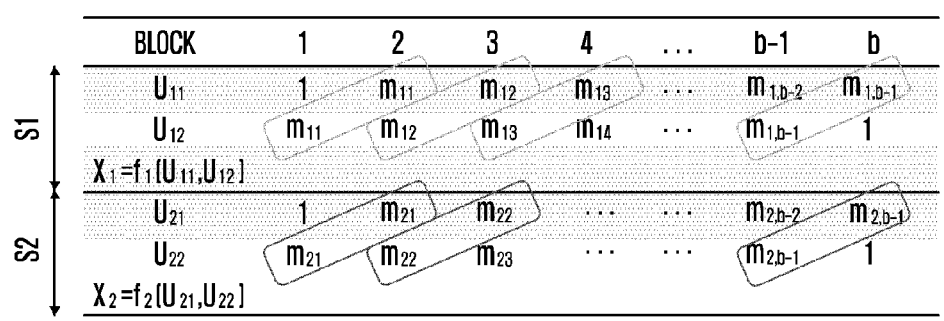
FIG. 10 illustrates transmission blocks where different bit mapping methods are applied to two transmitters according to an embodiment of the present disclosure.

FIG. 10 illustrates transmission blocks where different bit mapping methods are applied to two transmitters according to an embodiment of the present disclosure.

Referring to FIG. 10, each of the transmitter 1 and the transmitter 2 may use three bit mapping methods, and nine bit mapping methods may be generated by a combination of three bit mapping methods. Table 2 shows bit mapping methods according to each transmitter. A power ratio may be denoted by $\alpha o$.

TABLE 2

| Transmitter | Bit mapping |
| --- | --- |
| Transmitter 1 | $X1 = \sqrt{\alpha}U11 + \sqrt{(1-\alpha)}U12 \ldots (1)$ |
| | $X1 = \sqrt{(1-\alpha)}U11 + \sqrt{\alpha}U12 \ldots (2)$ |
| | $X1 = \sqrt{\alpha}U11 + \sqrt{(1-\alpha)}U11U12 \ldots (3)$ |
| Transmitter 2 | $X2 = \sqrt{\alpha}U21 + \sqrt{(1-\alpha)}U22 \ldots (1)$ |
| | $X2 = \sqrt{(1-\alpha)}U21 + \sqrt{\alpha}U22 \ldots (2)$ |
| | $X2 = \sqrt{\alpha}U21 + \sqrt{(1-\alpha)}U21U22 \ldots (3)$ |

Specifically, when $\alpha$ is 0.8, a bit mapping method (1) is applied to the transmitter 1, and a bit mapping method (3) is applied to the transmitter 2, a signal transmitted from the transmitter 1 may be expressed as '$X1=\sqrt{0.8}U11+\sqrt{0.2}U12$', and a signal transmitted from the transmitter 2 may be expressed as '$X2=\sqrt{0.8}U21+\sqrt{0.2}U21U22$.

FIGS. 11A to 11D illustrate achievable rate regions according to various decoding sequences when two transmitters transmit a signal using an SWSC according to various embodiments of the present disclosure.

Referring to FIGS. 11A, 11B, 11C and 11D, achievable rate regions are illustrated. A region S1 denotes the transmitter 1 and a region S2 denotes the transmitter 2. When both of the two transmitters use the SWSC, the receiver may decode data using one of four decoding sequences, and since the number of the receivers is two, a combination of 16 decoding sequences is possible.

Figure 11A:
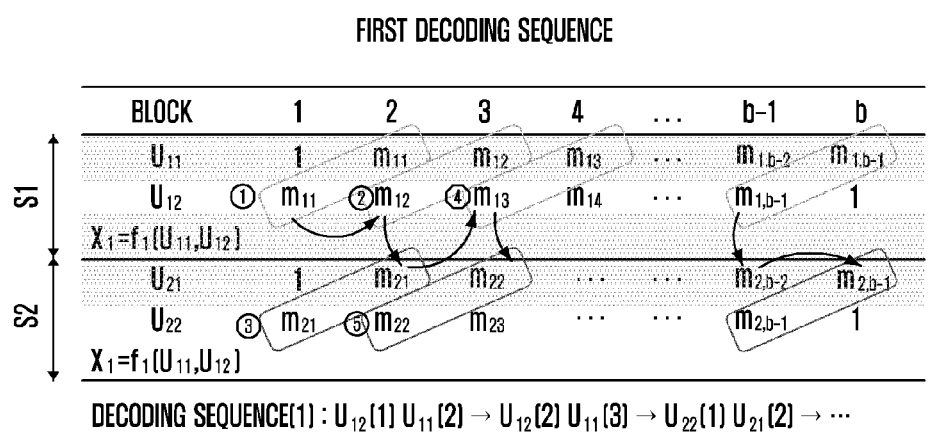
FIGS. 11A to 11D illustrate achievable rate regions according to various decoding sequences when two transmitters transmit a signal using an SWSC according to various embodiments of the present disclosure.
Figure 11A:
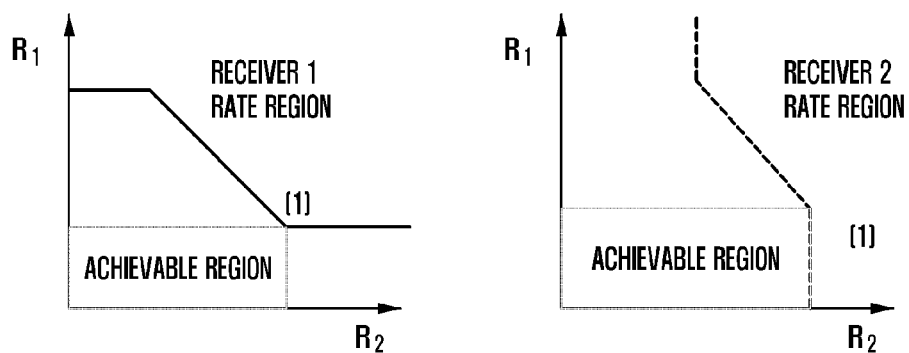
Figure 11B:
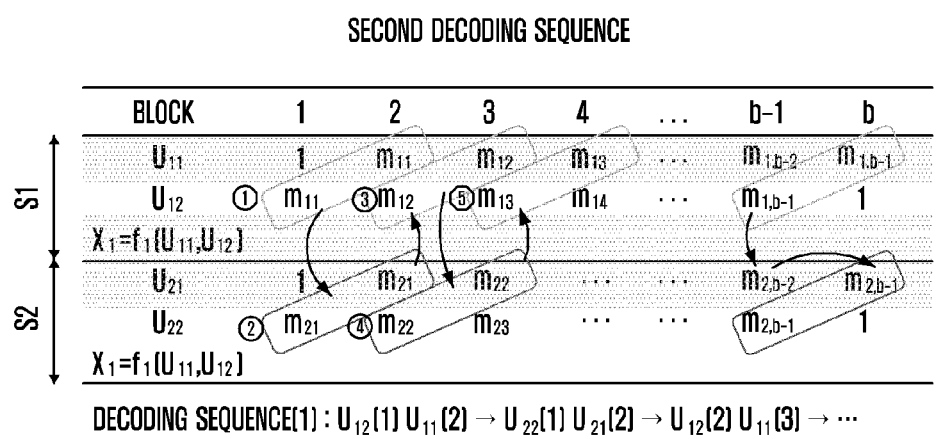
Figure 11B:
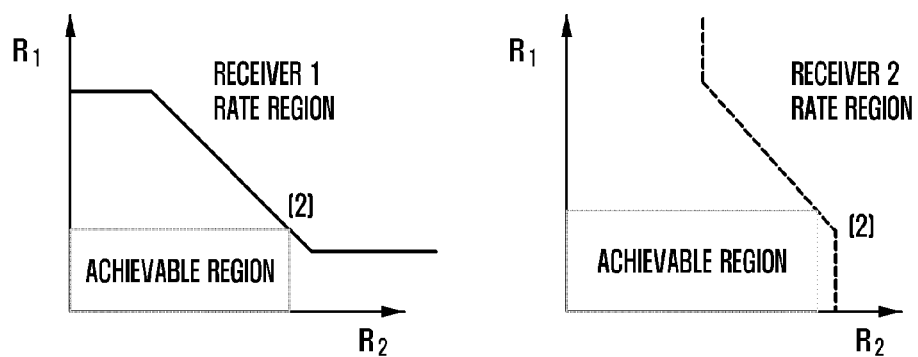
Figure 11C:
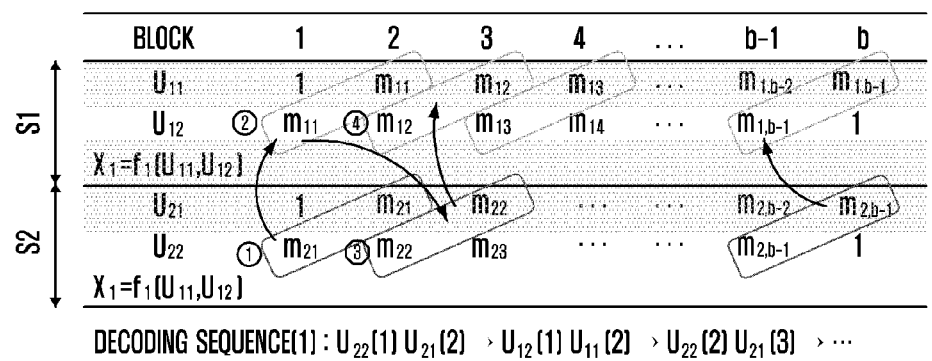
Figure 11C:
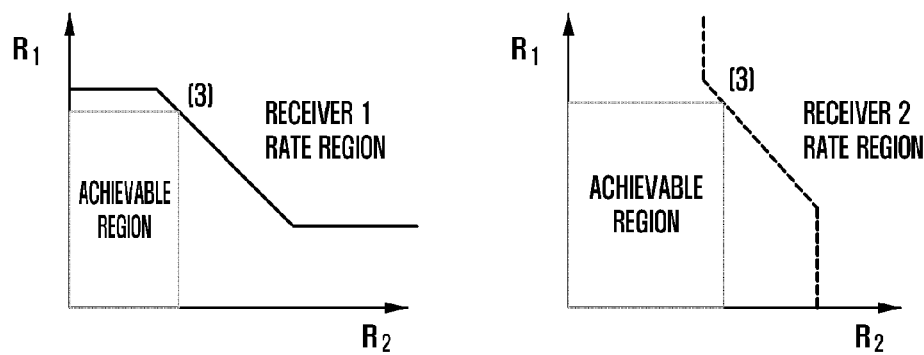
Figure 11D:
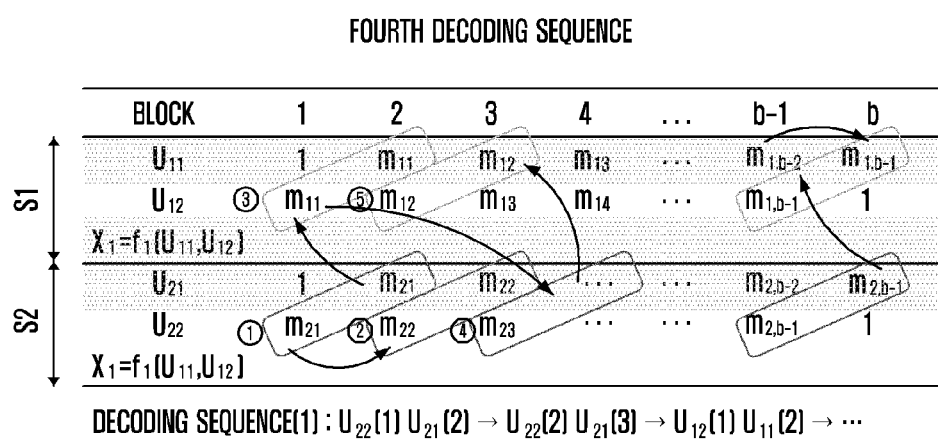
Figure 11D:
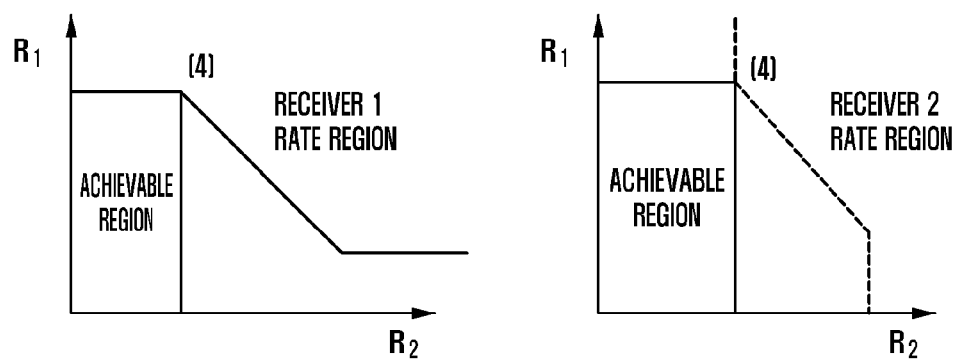

Referring to FIG. 11A, a decoding sequence (1) and an achievable rate region according to the decoding sequence (1) is illustrated. Referring to FIG. 11B, a decoding sequence (2) and an achievable rate region according to the decoding sequence (2) is illustrated. Referring to FIG. 11C, a decoding sequence (3) and an achievable rate region according to the decoding sequence (3) is illustrated. Referring to FIG. 11D, decoding sequence (4) and an achievable rate region according to the decoding sequence (4) is illustrated. When both of the two transmitters transmit the signal using the SWSC, various achievable rate regions are obtained in comparison to a case wherein only one transmitter of which a possible decoding sequence is three types transmits the signal using the SWSC. Therefore, a signal may be adaptively decoded using a decoding sequence suitable for various channel states and transmission rate pairs.

Figure 12:
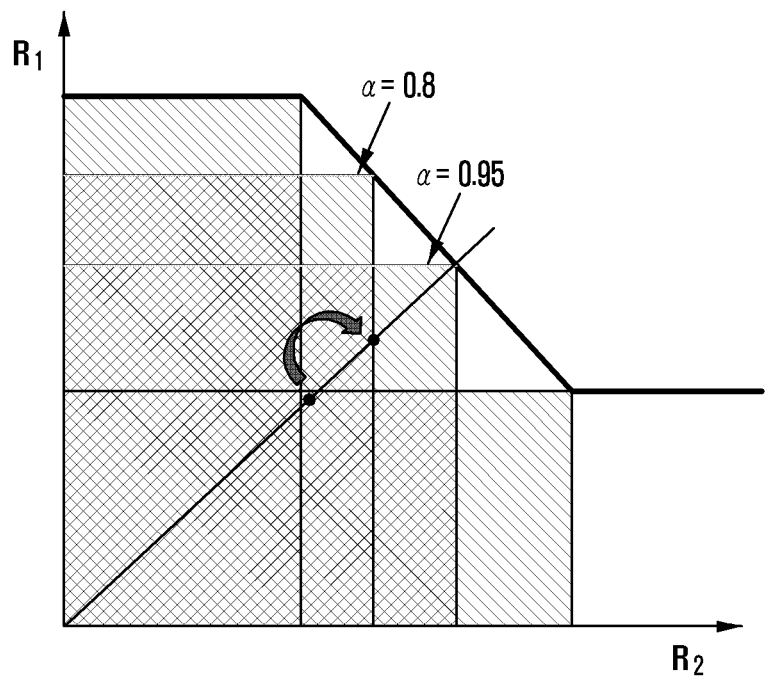
FIG. 12 is a view illustrating an achievable region changed according to a change of a power ratio according to an embodiment of the present disclosure.

FIG. 12 is a view illustrating an achievable region changed according to a change of a power ratio according to an embodiment of the present disclosure.

Referring to FIG. 12, achievable rate regions are illustrated in the case of power ratio $\alpha=0.8$ and in the case of power ratio $\alpha=0.95$, when the transmitter superposes a codeword in an amplitude of '$X=\sqrt{\alpha}U+\sqrt{(1-\alpha)}V$'. Since the achievable rate region is illustrated as shown in FIG. 12 according to the change of the power ratio $\alpha$, the transmitter may adaptively transmit a signal by properly controlling the power ratio according to a transmission rate pair through which the transmitter transmits the signal.

Figure 13:
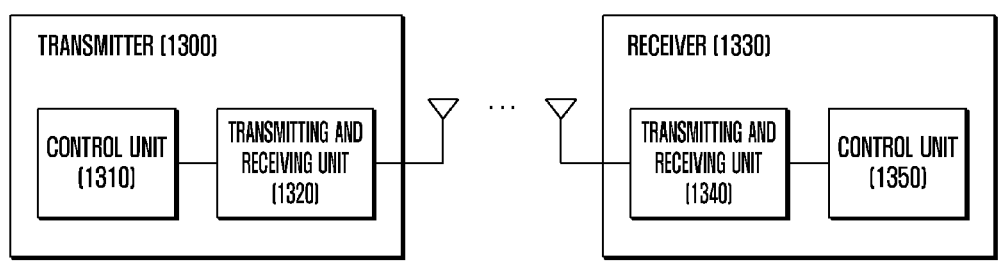
FIG. 13 is a block diagram illustrating an apparatus capable of performing an embodiment of the present disclosure according to an embodiment of the present disclosure.

FIG. 13 is a block diagram of an apparatus capable of performing an embodiment of the present disclosure according to an embodiment of the present disclosure.

Referring to FIG. 13, a transmitter 1300 may include a control unit 1310 and a transmitting and receiving unit 1320. The transmitting and receiving unit 1320 transmits and receives a signal to and from a receiver 1330. The control unit 1310 controls such that the transmitter 1300 receives channel state information from the receiver 1330, exchanges resource allocation related information with a neighbor transmitter, determines an SWSC method applied to a signal to be transmitted, based on the channel state information and the resource allocation related information, transmits the information related to the determined SWSC method to the receiver, and transmits the signal to which the determined SWSC method is applied.

The receiver 1330 may include a control unit 1350 and a transmitting and receiving unit. The transmitting and receiving unit transmits and receives a signal to and from a transmitter. The control unit 1350 controls such that the receiver 1330 transmits channel state information to the transmitter 1300, receives, from the transmitter 1300, information related to an SWSC method determined based on the channel state information and resource allocation related information of a neighbor transmitter received by the transmitter 1300, receives a signal to which the determined SWSC method is applied from the transmitter 1300, and performs an adaptive decoding on an interference signal received simultaneously with the signal based on the received information related to the SWSC method.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include read-only memory (ROM), random-access memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for receiving a signal by a user equipment (UE) using a sliding-window superposition coding (SWSC) in a wireless communication system, the method comprising:
    transmitting channel state information from the UE to a base station (BS);
    receiving, from the BS, SWSC information on an SWSC scheme, wherein the SWSC scheme is determined based on the channel state information and resource allocation information on a neighbor BS received by the BS;
    receiving, from the BS, a transmission signal to which the SWSC scheme is applied; and
    performing a decoding on an interference signal received simultaneously with the transmission signal based on the SWSC scheme.

2. The method of claim 1, wherein the SWSC information includes at least one of a superposition scheme for the transmission signal and the interference signal, a modulation scheme for the transmission signal and the interference signal, and a code rate.

3. The method of claim 1, wherein the resource allocation information includes at least one of synchronization information between the BS and the neighbor BS, information related to a transmission rate and a coding scheme of signals transmitted from each BS, and a block configuration.

4. The method of claim 3, wherein the decoding of the interference signal comprises decoding the transmission signal and the interference signal by selecting one among predetermined decoding sequences based on at least one of a calculation of a rate capable of being achieved by the UE, a previously written chart search, and a comparison between decoding results in a specific range.

5. The method of claim 1, wherein the decoding of the interference signal comprises decoding the transmission signal and the interference signal by selecting one among predetermined decoding sequences.

6. The method of claim 1, wherein the decoding includes a soft information based decoding.

7. A method for transmitting a signal by a base station (BS) using a sliding-window superposition coding (SWSC) in a wireless communication system, the method comprising:
    receiving channel state information from a user equipment (UE);
    exchanging resource allocation information with a neighbor BS;
    determining an SWSC scheme to apply to a transmission signal based on the channel state information and the resource allocation information;
    transmitting SWSC information indicating the SWSC scheme to the UE; and
    transmitting the transmission signal to which the SWSC scheme is applied.

8. The method of claim 7, wherein the SWSC information includes at least one of a number of layers, a power ratio between each layer, and bit mapping information.

9. The method of claim 7, wherein the resource allocation information includes at least one of synchronization information between the BS and the neighbor BS, information related to a transmission rate and a coding scheme of signals transmitted from each BS, and a block configuration.

10. A user equipment (UE) for receiving a signal using a sliding-window superposition coding (SWSC) in a wireless communication system, the UE comprising:
    a transceiver configured to transmit and receive the signal; and
    a controller configured to:
        transmit channel state information to a base station (BS),
        receive, from the BS, SWSC information on an SWSC scheme, wherein the SWSC scheme is determined based on the channel state information and resource allocation information on a neighbor BS received by the BS,
        receive, from the BS, a transmission signal to which the SWSC scheme is applied, and
        perform a decoding on an interference signal received simultaneously with the transmission signal based on the SWSC scheme.

11. The UE of claim 10, wherein the SWSC information includes at least one of a superposition scheme for the transmission signal and the interference signal, a modulation scheme of the transmission signal and the interference signal, and a code rate.

12. The UE of claim 10, wherein the resource allocation information includes at least one of synchronization information between the BS and the neighbor BS, information related to a transmission rate and a coding scheme of signals transmitted from each BS, and a block configuration.

13. The UE of claim 12, wherein the decoding of the interference signal comprises decoding the transmission signal and the interference signal by selecting one among predetermined decoding sequences based on at least one of a calculation of a rate capable of being achieved by the UE, a previously written chart search, and a comparison between decoding results in a specific range.

14. The UE of claim 10, wherein the decoding of the interference signal comprises decoding the transmission signal and the interference signal by selecting one among predetermined decoding sequences.

15. The UE of claim 10, wherein the decoding includes a soft information based decoding.

16. A base station (BS) for transmitting a signal using a sliding-window superposition coding (SWSC) in a wireless communication system, the BS comprising:
    a transceiver configured to transmit and receive the signal; and
    a controller configured to:

receive channel state information from a user equipment (UE), exchange resource allocation related information with a neighbor BS, determine an SWSC scheme applied to a transmission signal based on the channel state information and the resource allocation related information, transmit SWSC information indicating the SWSC scheme to the UE, and transmit the transmission signal to which the SWSC scheme is applied.

17. The BS of claim 16, wherein the SWSC information includes at least one of a number of layers, power ratio between each layer, and bit mapping information.

18. The BS of claim 16, wherein the resource allocation related information includes at least one of synchronization information between the BS and the neighbor BS, information related to a transmission rate and a coding scheme of signals transmitted from each BS, and a block configuration.

* * * * *